US010789489B2

(12) United States Patent
Kanno

(10) Patent No.: US 10,789,489 B2
(45) Date of Patent: Sep. 29, 2020

(54) VEHICLE EXTERIOR ENVIRONMENT RECOGNITION APPARATUS

(71) Applicant: SUBARU CORPORATION, Tokyo (JP)

(72) Inventor: Aito Kanno, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 112 days.

(21) Appl. No.: 15/987,749

(22) Filed: May 23, 2018

(65) Prior Publication Data

US 2019/0034741 A1 Jan. 31, 2019

(30) Foreign Application Priority Data

Jul. 26, 2017 (JP) .................................. 2017-144321

(51) Int. Cl.
*G06K 9/00* (2006.01)
*G06T 7/20* (2017.01)
*G06T 7/50* (2017.01)

(52) U.S. Cl.
CPC ..... *G06K 9/00805* (2013.01); *G06K 9/00201* (2013.01); *G06K 9/00369* (2013.01);
(Continued)

(58) Field of Classification Search
CPC ........... G06K 9/00805; G06K 9/00201; G06K 9/00369; G06K 9/00362; G06T 7/20; G06T 7/50; G06T 2207/30196
(Continued)

(56) References Cited

U.S. PATENT DOCUMENTS

| 2015/0294160 A1* | 10/2015 | Takahashi | .......... G06K 9/00791 382/104 |
| 2018/0276837 A1* | 9/2018 | Amano | ................... G06T 7/596 |
| 2018/0300562 A1* | 10/2018 | Yamada | ................... G06T 1/00 |

FOREIGN PATENT DOCUMENTS

| JP | 3349060 B2 | 11/2002 |
| JP | 2008-134877 A | 6/2008 |

(Continued)

OTHER PUBLICATIONS

Hiroo Kataoka, "Proceedings of Workshop of the Institute Image Information and Television Engineers", vol. 34, No. 34, Japan, Institute of Image Information and Television Engineers, Aug. 30, 2010, the 34th volume, pp. 39-42.

(Continued)

*Primary Examiner* — Ayodeji O Ayotunde
(74) *Attorney, Agent, or Firm* — McDermott Will & Emery LLP

(57) ABSTRACT

A vehicle exterior environment recognition apparatus includes a three-dimensional object region identifier and a specific part identifier. The three-dimensional object region identifier identifies a three-dimensional object region by monocular recognition based on a luminance image. The three-dimensional object region includes a three-dimensional object. The luminance image is generated by an image capturing unit that captures an image of vehicle exterior environment. The specific part identifier correlates the three-dimensional object region with a distance image, to identify a specific part of the three-dimensional object region on the basis of distance information. The distance image is generated from the luminance image. The distance information is calculated on the basis of the distance image.

3 Claims, 4 Drawing Sheets

(52) U.S. Cl.
CPC ............... *G06T 7/20* (2013.01); *G06T 7/50* (2017.01); *G06T 2207/30196* (2013.01); *G06T 2207/30261* (2013.01)

(58) Field of Classification Search
USPC ........................................ 382/104
See application file for complete search history.

(56) References Cited

FOREIGN PATENT DOCUMENTS

| | | |
|---|---|---|
| JP | 2010-066810 A | 3/2010 |
| JP | 2015-118671 A | 6/2015 |
| JP | 2015-156120 A | 8/2015 |

OTHER PUBLICATIONS

Japanese Office Action issued in corresponding Japanese Patent Application No. 2017-144321, dated Feb. 19, 2019, with English Translation.
Japanese Notice of Reasons for Refusal issued in corresponding Japanese Patent Application No. 2017-144321, dated Oct. 1, 2019, with English translation.

\* cited by examiner

VEHICLE EXTERIOR ENVIRONMENT RECOGNITION APPARATUS

CROSS-REFERENCE TO RELATED APPLICATIONS

The present application claims priority from Japanese Patent Application No. 2017-144321 filed on Jul. 26, 2017, the entire contents of which are hereby incorporated by reference.

BACKGROUND

The technology relates to a vehicle exterior environment recognition apparatus that identifies a specific object present in a traveling direction of an own vehicle.

A technique has been known that includes detecting a three-dimensional object, such as a vehicle located ahead of an own vehicle, and performing a control to avoid collision with a preceding vehicle (i.e., a collision avoidance control) or performing a control to keep a safe inter-vehicular distance from the preceding vehicle (i.e., a cruise control). For example, reference is made to Japanese Patent No. 3349060.

As a technique to detect the three-dimensional object, Japanese Unexamined Patent Application Publication (JP-A) No. 2008-134877 discloses a technique that includes detecting a parallel-traveling vehicle that travels parallel with the own vehicle, with reference to an image pattern photographed sideward of the own vehicle, on the basis of edge symmetry in a front-rear direction of the own vehicle.

SUMMARY

An aspect of the technology provides a vehicle exterior environment recognition apparatus that includes a three-dimensional object region identifier and a specific part identifier. The three-dimensional object region identifier is configured to identify a three-dimensional object region by monocular recognition based on a luminance image. The three-dimensional object region includes a three-dimensional object. The luminance image is generated by an image capturing unit configured to capture an image of vehicle exterior environment. The specific part identifier is configured to correlate the three-dimensional object region with a distance image, to identify a specific part of the three-dimensional object region on the basis of distance information. The distance image is generated from the luminance image. The distance information is calculated on the basis of the distance image.

An aspect of the technology provides a vehicle exterior environment recognition apparatus that includes circuitry. The circuitry is configured to identify a three-dimensional object region by monocular recognition based on a luminance image. The three-dimensional object region includes a three-dimensional object. The luminance image is generated by an image capturing unit configured to capture an image of vehicle exterior environment. The circuitry is configured to correlate the three-dimensional object region with a distance image, to identify a specific part of the three-dimensional object region on the basis of distance information. The distance image is generated from the luminance image. The distance information is calculated on the basis of the distance image.

DETAILED DESCRIPTION

Figure 1:
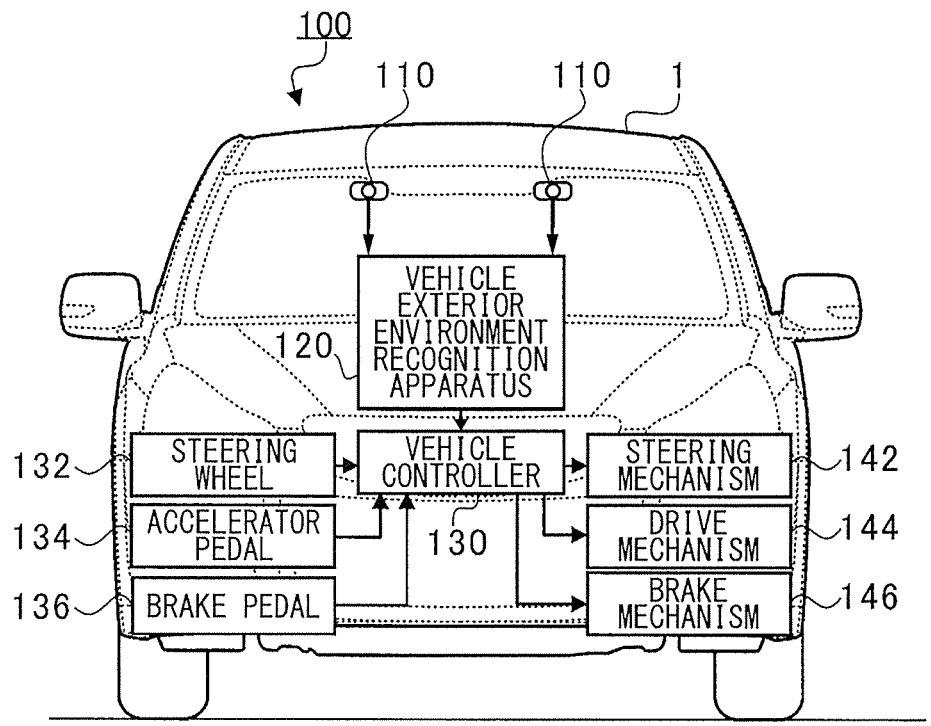
FIG. 1 is a block diagram illustrating a relation of connection in a vehicle exterior environment recognition system.

In the following, some preferred but non-limiting implementations of the technology are described in detail with reference to the accompanying drawings. Note that sizes, materials, specific values, and any other factors illustrated in respective implementations are illustrative for easier understanding of the technology, and are not intended to limit the scope of the technology unless otherwise specifically stated. Further, elements in the following example implementations which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same reference numerals to avoid any redundant description. Further, elements that are not directly related to the technology are unillustrated in the drawings.

Non-limiting examples of a specific object present in a traveling direction of an own vehicle may include a preceding vehicle that travels in a same direction, and objects such as a pedestrian, i.e., a human, and a bicycle that cross a traveling path in a lateral direction of the own vehicle. Regarding the objects such as the pedestrian and the bicycle that cross the traveling path, it is desirable to determine their pedestrian-likeliness or bicycle-likeliness, on the basis of their outlines. In many cases, however, a pedestrian is smaller in absolute volume and more unstable in behavior, as compared to a vehicle or a bicycle. If a collision avoidance control is postponed until confirmation of presence of the pedestrian on the basis of, for example, their entire outline, a distance from the own vehicle to the pedestrian may become short during the postponement. This may necessitate an abrupt action as the collision avoidance control.

In particular, there are cases where a pedestrian jumps into the traveling path from behind a three-dimensional object such as a vehicle. In such cases, while a relative distance from the pedestrian to the own vehicle takes a continuous value with a relative distance from the three-dimensional object to the own vehicle, it is difficult to distinguish the pedestrian from the three-dimensional object solely on the basis of distance information. This may result in difficulty in early detection of the pedestrian. As used herein, the distance information refers to information regarding the relative distance as mentioned above.

It is desirable to provide a vehicle exterior environment recognition apparatus that makes it possible to detect a specific object such as a pedestrian early.

Vehicle Exterior Environment Recognition System
100

FIG. 1 is a block diagram illustrating a relation of connection in a vehicle exterior environment recognition system 100. The vehicle exterior environment recognition system 100 may include image-capturing units 110, a vehicle exterior environment recognition apparatus 120, and a vehicle controller (e.g., an engine control unit (ECU)) 130. The implementation may include two image-capturing units 110 without limitation.

The two image-capturing units 110 may each include an imaging device such as, but not limited to, a charge-coupled device (CCD) and a complementary metal-oxide semiconductor (CMOS). The image-capturing units 110 may each be able to capture an image of vehicle exterior environment ahead of the own vehicle 1, and to generate a luminance image that includes at least information on luminance. The luminance image may be a color image or a monochrome image. The two image-capturing units 110 may be so disposed that their respective optical axes become substantially parallel to each other along a traveling direction of the own vehicle 1. The two image-capturing units 110 may be so disposed as to be separated away from each other in a substantially horizontal direction. The image-capturing units 110 may continuously generate the luminance image for each frame of, for example but not limited to, 1/60 second (at a frame rate of 60 fps). The luminance image may be an image that captures a three-dimensional object present in a detected region ahead of the own vehicle 1. Non-limiting examples of the three-dimensional objects to be recognized by the image-capturing units 110 may include a three-dimensional object that is present independently, and an object as a part of the independently-present object. Non-limiting examples of the independently-present object may include a bicycle, a pedestrian (or a human), a vehicle, a traffic light, a road (or a traveling path), a road sign, a guardrail, and a building. Non-limiting examples of the object as a part of the independently-present object may include a part of a body of a pedestrian, e.g., a head or shoulders.

The vehicle exterior environment recognition apparatus 120 may obtain the luminance images from the respective image-capturing units 110, and derive parallax information with use of so-called pattern matching. The pattern matching may involve extracting any block (e.g., an array of 4 pixels horizontally by 4 pixels vertically) from one of the luminance images, and searching for a corresponding block in another of the luminance images. The parallax information may include a parallax, and an on-screen position of any block. The on-screen position indicates a position of any block on a screen. In this implementation, the term "horizontally" refers to an on-screen lateral direction of the captured image, while the term "vertically" refers to an on-screen vertical direction of the captured image. A possible example of the pattern matching may be to compare a pair of images in terms of luminance (Y) block by block. Non-limiting examples may include techniques such as SAD (Sum of Absolute Difference), SSD (Sum of Squared intensity Difference), and ZNCC (Zero-mean Normalized Cross Correlation). The SAD includes obtaining differences in the luminance. The SSD includes using the differences squared. The ZNCC includes obtaining similarity of variance values obtained by subtracting an average value from luminance values of pixels. The vehicle exterior environment recognition apparatus 120 may perform such a block-by-block parallax derivation process, for all blocks displayed in the detected region of, for example, 600 pixels by 200 pixels. In this implementation, one block is assumed to be the array of 4 pixels by 4 pixels, but the number of the pixels inside one block may be set at any value.

It is to be noted that the vehicle exterior environment recognition apparatus 120 is able to derive the parallax for each of the blocks, but the vehicle exterior environment recognition apparatus 120 is not able to recognize what kind of object each of the blocks belongs to. The block serves as a unit of detection resolution. It follows, therefore, that the parallax information is derived not by the object but independently by the detection resolution in the detected region, e.g., by the block. In this implementation, an image with which the parallax information thus derived is correlated is referred to as a distance image, in distinction from the luminance image as mentioned above.

Figure 2A:
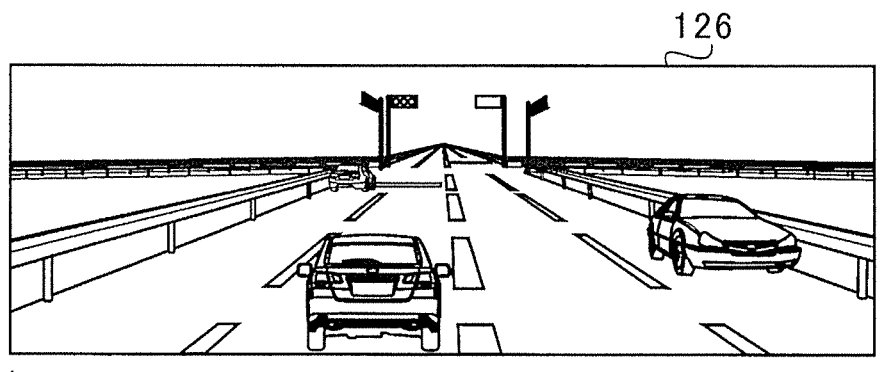
FIGS. 2A and 2B respectively describe a luminance image and a distance image.
Figure 2B:
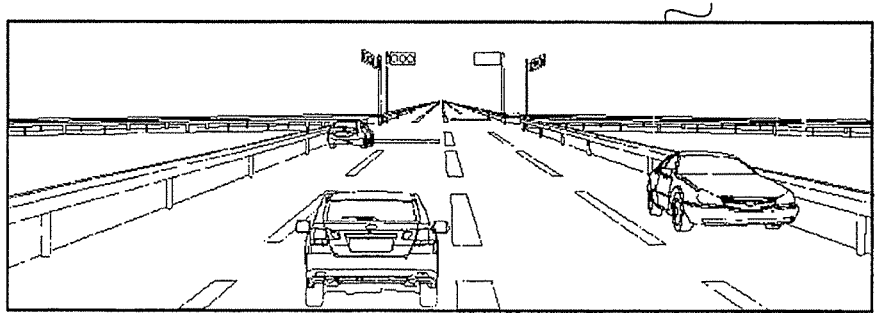

FIGS. 2A and 2B respectively describe the luminance image 126 and the distance image 128. FIG. 2A describes a non-limiting example in which the luminance image 126 as illustrated in FIG. 2A is generated for the detected region 124 by means of the two image-capturing units 110. Note that FIG. 2A schematically illustrates only one of the two luminance images 126 generated by the respective image-capturing units 110 for easier understanding. The vehicle exterior environment recognition apparatus 120 may obtain the parallax for each of the blocks from the luminance images 126 to form the distance image 128 as illustrated in FIG. 2B. Each of the blocks in the distance image 128 may be associated with the parallax of the relevant block. For description purpose, each of the blocks for which the parallax is derived is denoted by a black dot.

Moreover, the vehicle exterior environment recognition apparatus 120 may perform grouping of blocks, as an object. The grouping may be made with the use of luminance values, i.e., color values, based on the luminance image 126, and with the use of three-dimensional positional information in real space. The three-dimensional positional information may be calculated on the basis of the distance image 128, and include a relative distance to the own vehicle 1. The blocks to be grouped may be of equal color values, and of close relative distances included in the three-dimensional positional information. The vehicle exterior environment recognition apparatus 120 may identify which specific object the object in the detected region ahead of the own vehicle 1 corresponds to. Non-limiting example of the specific object may include a preceding vehicle and a pedestrian. Moreover, upon identifying the three-dimensional object in this way, the vehicle exterior environment recognition apparatus 120 may further control the own vehicle 1, to avoid collision with the three-dimensional object (i.e., the collision avoidance control) or to keep a safe inter-vehicular distance from the preceding vehicle (i.e., a cruise control). Note that the relative distance as mentioned above may be obtained by converting the parallax information for each of the blocks in the distance image 128 to the three-dimensional positional information with the use of a so-called stereo method. In this implementation, the stereo method refers to a method of deriving, from the parallax of the object, the relative distance of the relevant object with respect to the image-capturing units 110, with the use of triangulation.

Returning to FIG. 1, the vehicle controller 130 may control the own vehicle 1 by accepting an operation input of the driver through a steering wheel 132, an accelerator pedal 134, and a brake pedal 136 and transmitting the operation input to a steering mechanism 142, a drive mechanism 144, and a brake mechanism 146. The vehicle controller 130 may control the steering mechanism 142, the drive mechanism 144, and the brake mechanism 146, in accordance with instructions from the vehicle exterior environment recognition apparatus 120.

In the following, described in detail is a configuration of the vehicle exterior environment recognition apparatus 120. A description is given here in detail of an identification process of the three-dimensional object (e.g., a pedestrian) in the detected region ahead of the own vehicle 1. Note that a configuration less related to features of the implementation will not be described in detail.

Vehicle Exterior Environment Recognition Apparatus 120

Figure 3:
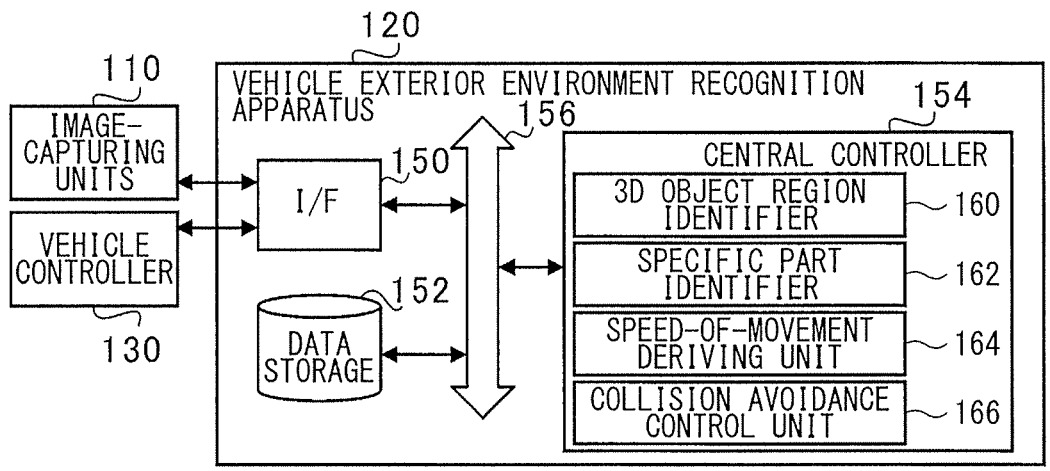
FIG. 3 is a functional block diagram illustrating schematic functions of a vehicle exterior environment recognition apparatus.

FIG. 3 is a functional block diagram illustrating schematic functions of the vehicle exterior environment recognition apparatus 120. Referring to FIG. 3, the vehicle exterior environment recognition apparatus 120 may include an interface (I/F) 150, a data storage 152, and a central controller 154.

The interface 150 may be an interface that exchanges information bi-directionally between devices including, without limitation, the image-capturing units 110 and the vehicle controller 130. The data storage 152 may include a random access memory (RAM), a flash memory, a hard disk drive (HDD), or any other suitable storage device. The data storage 152 may store various pieces of information necessary for processes to be carried out by the functional blocks to be described hereinafter.

The central controller 154 may include a semiconductor integrated circuit, and control devices including, without limitation, the interface 150 and the data storage 152 through a system bus 156. The semiconductor integrated circuit may have devices such as, but not limited to, a central processing unit (CPU), a read only memory (ROM) in which programs, etc., are stored, and a random access memory (RAM) serving as a work area. In this implementation, the central controller 154 may function as a three-dimensional object region identifier 160, a specific part identifier 162, a speed-of-movement deriving unit 164, and a collision avoidance control unit 166. In the following, a detailed description is given, on the basis of operation of each functional block of the central controller 154 as well, of a vehicle exterior environment recognition process that involves, as a feature of the implementation, recognizing a pedestrian, i.e., a human.

Vehicle Exterior Environment Recognition Process

Figure 4:
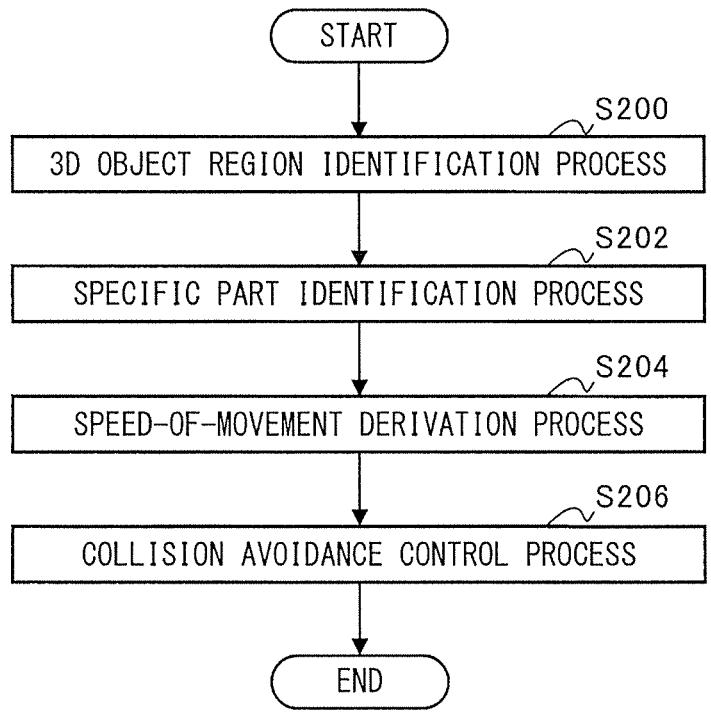
FIG. 4 is a flowchart illustrating an example of a flow of a vehicle exterior environment recognition process.

FIG. 4 is a flowchart illustrating an example of a flow of the vehicle exterior environment recognition process. The vehicle exterior environment recognition process may involve execution of the following processes: a three-dimensional object region identification process (S200); a specific part identification process (S202); a speed-of-movement derivation process (S204); and a collision avoidance control process (S206). In the three-dimensional object region identification process (S200), the three-dimensional object region identifier 160 identifies a three-dimensional object region by monocular recognition based on the luminance image 126. The three-dimensional object region includes the three-dimensional object, e.g., a pedestrian. In the specific part identification process (S202), the specific part identifier 162 correlates the three-dimensional object region with the distance image 128, to identify a specific part of the three-dimensional object region on the basis of the distance information. In the speed-of-movement derivation process (S204), the speed-of-movement deriving unit 164 may derive a speed of movement of the specific part identified. Lastly, in the collision avoidance control process (S206), the collision avoidance control unit 166 may execute the collision avoidance control. It is to be noted that the vehicle exterior environment recognition process may be repetitively executed for each frame of acquisition of the luminance image 126 and the distance image 128.

Three-Dimensional Object Region Identification Process S200

Figure 5A:
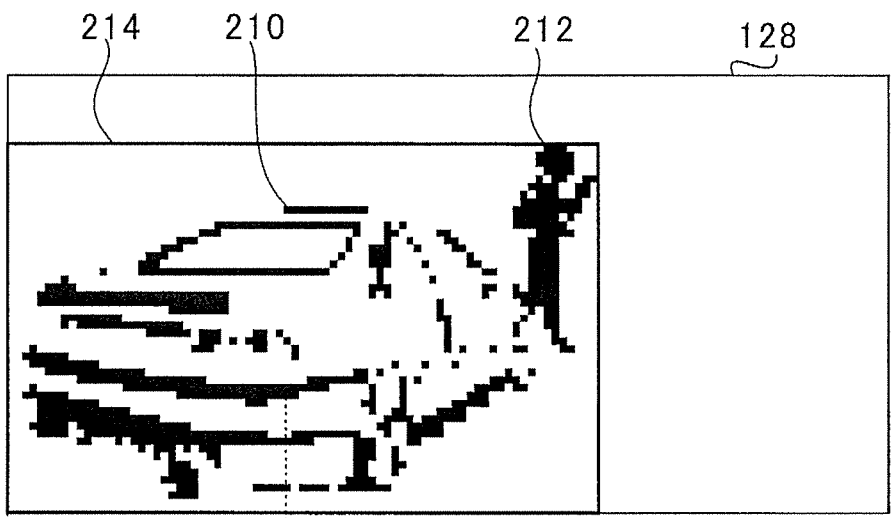
FIG. 5A, FIG. 5B and FIG. 5C describe examples of a three-dimensional object region identification process.
Figure 5B:
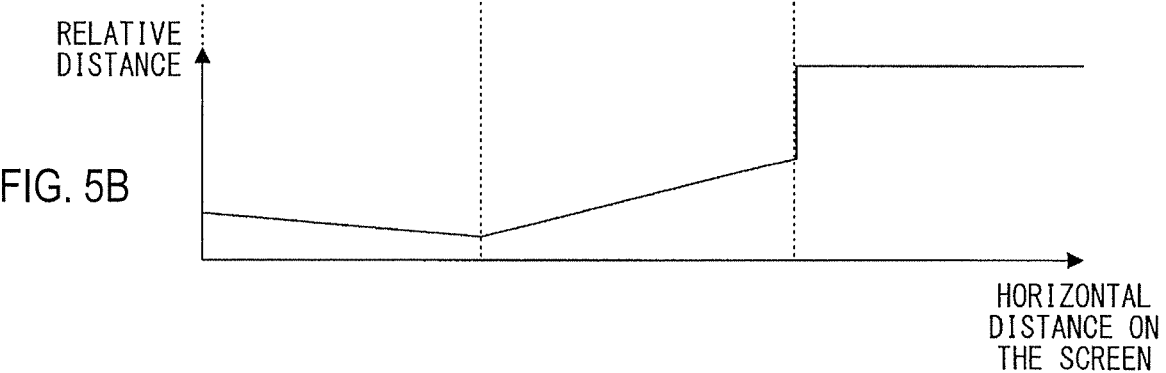
Figure 5C:
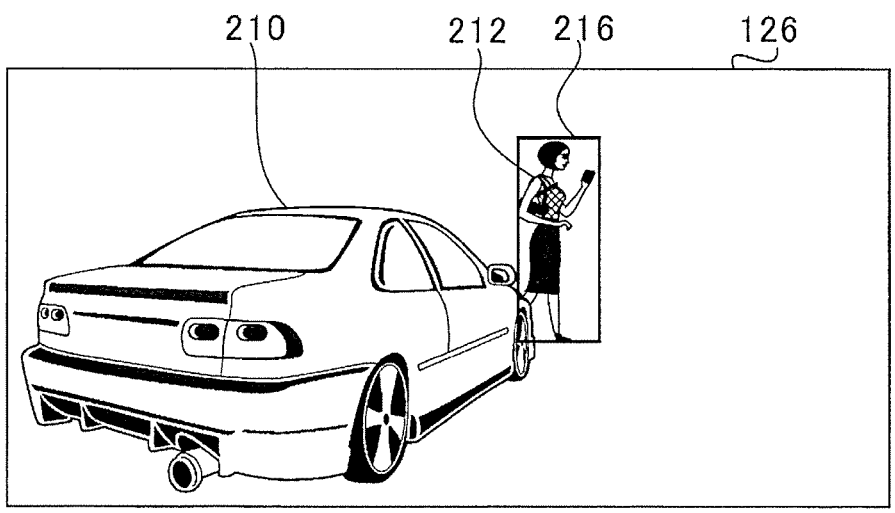

FIGS. 5A-5C describe examples of the three-dimensional object region identification process S200. Described first is an attempt at identifying a pedestrian on the basis of the distance image 128 illustrated in FIG. 5A. This attempt assumes a case where a three-dimensional object 212 jumps from behind a three-dimensional object 210 located in the distance image 128. The three-dimensional object 212 corresponds to the pedestrian. The three-dimensional object 210 corresponds to an automobile. The automobile and the pedestrian are in separate and distinct relation from each other. However, while a distance from the automobile to the pedestrian is small, as illustrated in FIG. 5B, the relative distance from the three-dimensional object 210 corresponding to the automobile with respect to the own vehicle 1 takes a continuous value with the relative distance from the three-dimensional object 212 corresponding to the pedestrian with respect to the own vehicle 1. Accordingly, detecting a three-dimensional object on the basis of the distance image 128 causes a large three-dimensional object region 214 to be formed as illustrated in FIG. 5A. The large three-dimensional object region 214 includes both the three-dimensional object 210 corresponding to the automobile and the three-dimensional object 212 corresponding to the pedestrian. This makes it difficult to distinguish the pedestrian from the automobile.

Described now is another attempt at identifying the pedestrian on the basis of the luminance image 126, instead of the distance image 128. In one specific but non-limiting example, as illustrated in FIG. 5C, the pedestrian is identified, employing a recognition technique that includes recognizing a specific object with the use of machine learning on the basis of a shape or a pattern of any image in a monocular image, i.e., solely in one of the two luminance images 126. This recognition technique is hereinafter simply referred to as the "monocular recognition". In this case, as illustrated in FIG. 5C, a three-dimensional object region 216 is formed that appropriately includes solely the pedestrian.

The monocular recognition as mentioned above identifies the three-dimensional object as the pedestrian with high probability, but precision of identification of a position of the three-dimensional object is not so high. Moreover, a shape of the three-dimensional object region 216 easily changes in accordance with behavior of the pedestrian. Therefore, the vehicle exterior environment recognition system 100 is able to grasp presence of the pedestrian on the traveling path, but may have difficulty in accurately identifying a speed of movement of the pedestrian. This may cause possibility of instability of the collision avoidance control with the pedestrian.

What is desired in this implementation is, therefore, to effectively unite identification of a three-dimensional object as a pedestrian by the monocular recognition, with identification of a position or a speed of movement of the pedestrian with the use of the distance image 128, to detect a specific object such as a pedestrian early and stably.

Accordingly, as illustrated in FIG. 5C, the three-dimensional object region identifier 160, first, identifies the three-dimensional object region 216 by the monocular recognition based on the luminance image 126. The three-dimensional object region 216 includes the pedestrian. However, the three-dimensional object region identifier 160 may refrain from deriving the speed of movement of the pedestrian from a result of the monocular recognition.

Specific Part Identification Process S202

Figure 6A:
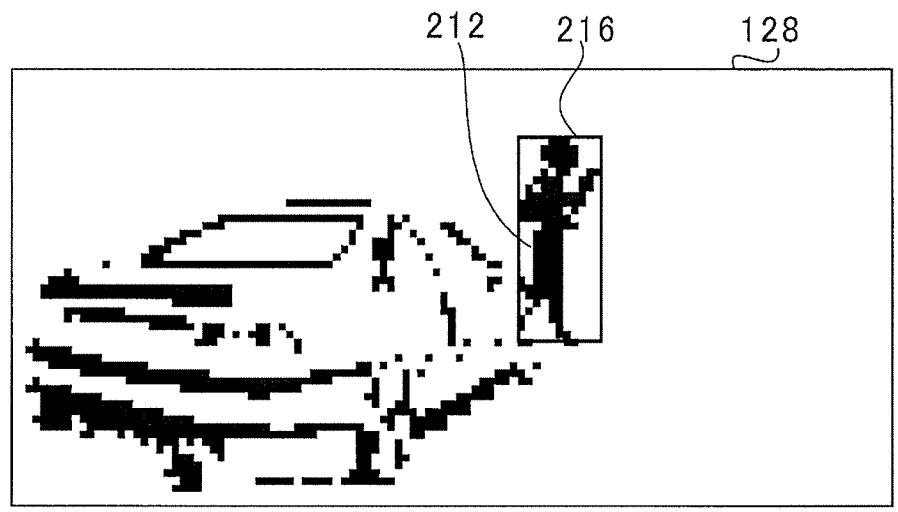
FIG. 6A, FIG. 6B and FIG. 6C describe examples of a specific part identification process.
Figure 6B:
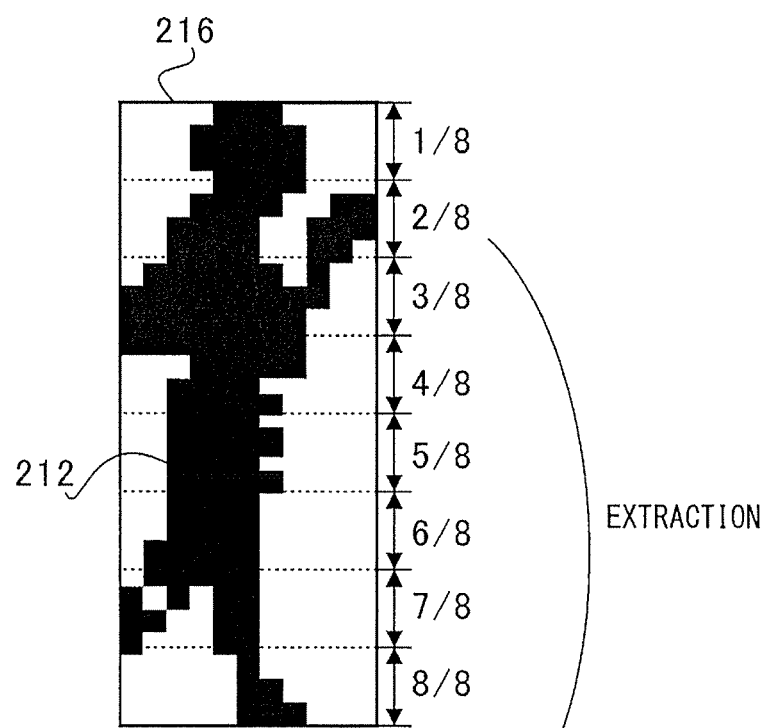
Figure 6C:
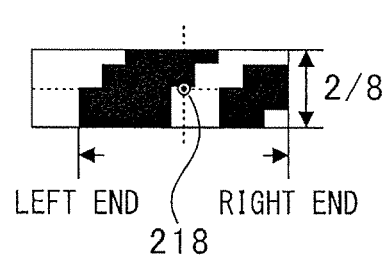

FIGS. 6A-6C describe examples of the specific part identification process S202. The specific part identifier 162 correlates the three-dimensional object region 216 just as identified on the luminance image 126 by the monocular recognition, with the distance image 128, to a corresponding position of the distance image 128. Thus, as illustrated in FIG. 6A, the three-dimensional object region 216 is formed on the distance image 128. The three-dimensional object region 216 on the distance image 128 is identical to that on the luminance image 126. In other words, a shape and area of the three-dimensional object region 216 on the distance image 128 are identical to those on the luminance image 126.

Thereafter, as illustrated in FIG. 6B, the specific part identifier 162 may equally divide the three-dimensional object region 216 on the distance image 128 into a predetermined number of divisions. In this example, the specific part identifier 162 may equally divide the three-dimensional object region 216 on the distance image 128 into, for example, eight vertically-arranged divisions each of which is shaped of a laterally-disposed strip. The specific part identifier 162 may extract the three-dimensional object 212 included in a division in a predetermined ordinal number from top of the screen. In this example, the specific part identifier 162 may extract the three-dimensional object 212 included in a division in the second place from the top, as illustrated in FIG. 6C. In this implementation, the place of the division to be extracted is decided on an assumption that the shoulders of the pedestrian are located in the division in the second place from the top, among the eight vertically-arranged divisions of the pedestrian.

Thereafter, the specific part identifier 162 may identify a left end and a right end of a segment having the distance information, i.e., pixels or blocks having the distance information, out of the extracted division. In this implementation, the segment having the distance information refers to a segment the relative distance of which falls within a predetermined range with reference to an average relative distance of the three-dimensional object 212 with respect to the own vehicle 1. The predetermined range may be, for example, ±1 meter. It is to be noted that in a case where the extracted division includes no segment having the distance information, a determination may be made that the relevant three-dimensional object 212 is not a pedestrian, and the vehicle exterior environment recognition process may be terminated.

Thereafter, as illustrated in FIG. 6C, the specific part identifier 162 may identify, as a specific part 218, a point that is positioned horizontally in the middle of the left end and the right end thus identified, and is positioned vertically in the middle of the extracted division.

Speed-of-Movement Derivation Process S204

The speed-of-movement deriving unit 164 may derive a direction of movement and the speed of movement of the specific part 218. The derivation may be made on the basis of a difference between a position of the lately-identified specific part 218 on the distance image 128 and a position of the preceding-identified specific part 218 on the distance image 128, and on the basis of the relative distances thereof. The speed-of-movement deriving unit 164 may store the lately-identified specific part 218 to update a next-time preceding value.

Collision Avoidance Control Process S206

On the ground that the three-dimensional object region 216 identified by the three-dimensional object region identifier 160 includes a pedestrian, and that the pedestrian is moving in the direction of movement and at the speed of movement derived by the speed-of-movement deriving unit 164, the collision avoidance control unit 166 may execute the collision avoidance control, in order to avoid the collision with the pedestrian.

As described, in this implementation, first, the three-dimensional object is identified as a pedestrian by the monocular recognition. This makes it possible to detect the pedestrian earlier, as compared to a case solely with the use of the distance information. Hence, it is possible to detect a specific object such as a pedestrian early.

Moreover, the position and the speed of movement of the pedestrian may be derived with the use of the distance image 128, without depending solely on the monocular recognition. This makes it possible to enhance precision of the identification of the position and the speed of movement. Hence, it is possible to detect the specific object such as a pedestrian early and stably.

Furthermore, in identifying the position of the pedestrian, the vertical position of the pedestrian may be set at a level corresponding to the shoulders of a human, i.e., a level between the neck and the chest. Because the shoulders are less likely to shift from a central axis of a human body, as compared to the head or the legs, it is possible to enhance the precision of the identification. It is to be noted that a lumbar part may serve as an alternative because the lumbar part is also unlikely to shift from the central axis of the human body. However, a locus of the lumbar part is sometimes unstable under an influence of arms and hands that move back and forth because of walking. Accordingly, it would be desirable to use the shoulders.

In addition, in identifying the position of the pedestrian, the horizontal position of the pedestrian may be set at a position corresponding to a midpoint of the shoulders of the human. Hence, it is possible to acquire a stable locus of movement, even in a case where the shoulders move back and forth because of walking.

The implementation also provides a program that causes a computer to function as the vehicle exterior environment recognition apparatus 120, and a non-transitory recording medium that stores the program. The non-transitory recording medium is computer readable. Non-limiting examples of the non-transitory recording medium may include a flexible disk, a magneto-optical disk, ROM, CD, DVD (Registered Trademark), and BD (Registered Trademark). As used herein, the term "program" may refer to a data processor written in any language and any description method.

Although some preferred implementations of the technology have been described in the foregoing by way of example with reference to the accompanying drawings, the technology is by no means limited to the implementations described above. It should be appreciated that modifications and alterations may be made by persons skilled in the art without departing from the scope as defined by the appended claims. The technology is intended to include such modifications and alterations in so far as they fall within the scope of the appended claims or the equivalents thereof.

For instance, in one implementation described above, the description is made by giving an example where the three-dimensional object may be a pedestrian, or a human. The specific part of the three-dimensional object may be the horizontal midpoint between the vertical positions that correspond to the shoulders of the pedestrian. However, the technology is not limited to such an implementation. The technology may be targeted at various three-dimensional objects that are eligible to be targets of the monocular recognition, e.g., a bicycle, a motorcycle, and an automobile.

In one implementation described above, the description is made on an example where the specific part is vertically positioned at the level corresponding to the shoulders of the pedestrian. Specifically, the three-dimensional object region 216 is equally divided into the eight vertically-arranged divisions, and the division in the second place from the top is extracted. However, the number of the divisions and the place of the division to be extracted are not limited to as described above, and various values may be adopted. For example, the three-dimensional object region 216 may be equally divided into four divisions, and an uppermost division may be extracted. In another alternative, the three-dimensional object region 216 may be equally divided into five divisions, and a division in the second place from the top may be extracted.

A part or all of the processes in the vehicle exterior environment recognition process as disclosed herein does not necessarily have to be processed on a time-series basis in the order described in the example flowchart. A part or all of the processes in the vehicle exterior environment recognition process may involve parallel processing or processing based on subroutine.

The central controller 154 illustrated in FIG. 3 is implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of the central controller 154. Such a medium may take many forms, including, but not limited to, any type of magnetic medium such as a hard disk, any type of optical medium such as a compact disc (CD) and a digital video disc (DVD), any type of semiconductor memory (i.e., semiconductor circuit) such as a volatile memory and a non-volatile memory. The volatile memory may include a dynamic random access memory (DRAM) and a static random access memory (SRAM), and the non-volatile memory may include a ROM and a non-volatile RAM (NVRAM). The ASIC is an integrated circuit (IC) customized to perform, and the FPGA is an integrated circuit designed to be configured after manufacturing in order to perform, all or a part of the functions of the central controller 154 illustrated in FIG. 3.

Although some implementations of the technology have been described in the foregoing by way of example with reference to the accompanying drawings, the technology is by no means limited to the implementations described above. The use of the terms first, second, etc. does not denote any order or importance, but rather the terms first, second, etc. are used to distinguish one element from another. It should be appreciated that modifications and alterations may be made by persons skilled in the art without departing from the scope as defined by the appended claims. The technology is intended to include such modifications and alterations in so far as they fall within the scope of the appended claims or the equivalents thereof.

The invention claimed is:

1. A vehicle exterior environment recognition apparatus, comprising:
a three-dimensional object region identifier configured to identify a three-dimensional object region by monocular recognition based on a luminance image, the three-dimensional object region including a three-dimensional object, and the luminance image being generated by an image capturing unit configured to capture an image of vehicle exterior environment; and
a specific part identifier configured to correlate the three-dimensional object region with a distance image to identify a specific part of the three-dimensional object region on a basis of distance information, the distance image being generated from the luminance image, and the distance information being calculated on a basis of the distance image,
wherein the three-dimensional object is a human, and
wherein the specific part is a horizontal midpoint between vertical positions that correspond to shoulders of the human.

2. The vehicle exterior environment recognition apparatus according to claim 1, further comprising a speed-of-movement deriving unit configured to derive, on the basis of the distance image, a speed of movement of the specific part identified.

3. A vehicle exterior environment recognition apparatus, comprising:
circuitry configured to:
identify a three-dimensional object region by monocular recognition based on a luminance image, the three-dimensional object region including a three-dimensional object, and the luminance image being generated by an image capturing unit configured to capture an image of vehicle exterior environment; and
correlate the three-dimensional object region with a distance image, to identify a specific part of the three-dimensional object region on a basis of distance information, the distance image being generated from the luminance image, and the distance information being calculated on a basis of the distance image,
wherein the three-dimensional object is a human, and
wherein the specific part is a horizontal midpoint between vertical positions that correspond to shoulders of the human.

* * * * *